United States Patent
Toyama et al.

(10) Patent No.: US 10,354,021 B2
(45) Date of Patent: Jul. 16, 2019

(54) DEVICE FOR CALCULATING BUNDLE DIAMETER OF ELECTRICAL WIRE BUNDLE

(71) Applicant: Mitsubishi Aircraft Corporation, Aichi (JP)

(72) Inventors: Koji Toyama, Tokyo (JP); Yoshihiro Nakayama, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 357 days.

(21) Appl. No.: 15/046,709

(22) Filed: Feb. 18, 2016

(65) Prior Publication Data

US 2016/0283612 A1    Sep. 29, 2016

(30) Foreign Application Priority Data

Mar. 24, 2015   (JP) .................................. 2015-060267

(51) Int. Cl.
*G06F 17/50*   (2006.01)
*G06F 17/22*   (2006.01)

(52) U.S. Cl.
CPC .......... *G06F 17/50* (2013.01); *G06F 2217/36* (2013.01)

(58) Field of Classification Search
USPC ........ 703/1, 2; 702/1; 174/103; 73/12.01, 82
See application file for complete search history.

(56) References Cited

U.S. PATENT DOCUMENTS

| | | | | |
|---|---|---|---|---|
| 5,506,950 A | * | 4/1996 | Hughes | G06F 17/509 345/420 |
| 7,529,638 B2 | * | 5/2009 | Sawai | G06F 17/5018 702/1 |
| 7,558,705 B1 | * | 7/2009 | Hughes | G06F 17/509 174/34 |
| 8,694,952 B2 | * | 4/2014 | Holdsworth | G06F 17/5095 716/126 |

(Continued)

FOREIGN PATENT DOCUMENTS

| | | |
|---|---|---|
| JP | 2003141949 A | 5/2003 |
| JP | 2008299526 A | 12/2008 |

(Continued)

OTHER PUBLICATIONS

Japanese Office Action for corresponding Japanese Patent Application No. 2015-060267 dated Mar. 5, 2019.

*Primary Examiner* — Thai Q Phan
(74) *Attorney, Agent, or Firm* — Pearne & Gordon LLP (57) ABSTRACT

A bundle diameter calculation device calculates the number of electrical wires belonging to an electrical wire bundle constituting a part of a wire harness of which each of the plurality of electrical wires is connected via relay points with connectors, the device including: a storage unit which stores electrical wire-connector connection information in which each of the plurality of electrical wires and the connectors are associated with each other, and bundle connection information which shows a state of connection with the connectors and relay elements by the unit of the electrical wire bundle of the wire harness; and a processing unit which, when the wire harness is specified, checks the electrical wire-connector connection information and the bundle connection information against each other and calculates the bundle diameter of the electrical wire bundle.

17 Claims, 8 Drawing Sheets

(56) References Cited

U.S. PATENT DOCUMENTS

| | | | |
|---|---|---|---|
| 9,289,147 B2 * | 3/2016 | Tegg | A61B 5/042 |
| 2004/0144559 A1 * | 7/2004 | Menze | H02G 3/0481 |
| | | | 174/103 |
| 2010/0070243 A1 * | 3/2010 | Yvon | G06F 17/509 |
| | | | 703/1 |
| 2014/0088919 A1 | 3/2014 | Toyama et al. | |
| 2014/0218046 A1 | 8/2014 | Nakayama et al. | |
| 2014/0297207 A1 | 10/2014 | Toyama et al. | |

FOREIGN PATENT DOCUMENTS

| | | |
|---|---|---|
| JP | 5182973 B1 | 4/2013 |
| JP | 2014061841 A | 4/2014 |
| JP | 2014194676 A | 10/2014 |

* cited by examiner

HARNESS ID:WH1

| No. | WIRE ID | ITEM-1 | PIN-1 | ITEM-2 | PIN-2 | Leng. | WIRE CODE | CON. CODE | |
|---|---|---|---|---|---|---|---|---|---|
| 1 | W1 | C1 | 1 | C2 | 1 | L1 | #W1 | #C1 | #C2 |
| 2 | W2 | | 2 | | 2 | L1 | | | |
| 3 | W3 | | 3 | | 3 | L1 | | | |
| 4 | W4 | | 4 | C3 | 1 | L2 | | | #C3 |
| 5 | W5 | | 5 | | 2 | L2 | | | |
| 6 | W6 | | 6 | C4 | 1 | L3 | #W2 | | #C4 |
| 7 | W7 | | 7 | | 2 | L3 | | | |
| 8 | W8 | | 8 | | 3 | L3 | | | |
| 9 | W9 | C2 | 4 | C3 | 3 | L4 | #W3 | #C2 | #C3 |
| 10 | W10 | | 5 | | 4 | L4 | | | |
| 11 | W11 | | 6 | C4 | 4 | L5 | | | #C4 |
| 12 | W12 | | 7 | | 5 | L5 | | | |
| 13 | W13 | C3 | 5 | C4 | 6 | L6 | #W4 | #C3 | #C3 |

FIG. 4

| WIRE CODE | d |
|---|---|
| #W1 | d1 |
| #W2 | d2 |
| #W3 | d3 |
| #W4 | d4 |

| CON. CODE | PIN USED | PIN NOT USED |
|---|---|---|
| #C1 | 1, 2, 3, 4, 5, 6, 7, 8 | 9, 10 |
| #C2 | 1, 2, 3, 4, 5, 6, 7 | 8 |
| #C3 | 1, 2, 3, 4, 5 | 6, 7, 8 |
| #C4 | 1, 2, 3, 4, 5, 6 | 7, 8 |

FIG. 5

| Bundle Section | ITEM1 | ITEM2 |
|---|---|---|
| B1 | C1 | A1 |
| B2 | C2 | A1 |
| B3 | A1 | A2 |
| B4 | A2 | C3 |
| B5 | A2 | C4 |

FIG. 6

| No. | END1 | END2 | SECTION | #W1 | #W2 | #W3 | #W4 | SECTION | #W1 | #W2 | #W3 | #W4 | SECTION | #W1 | #W2 | #W3 | #W4 |
|---|---|---|---|---|---|---|---|---|---|---|---|---|---|---|---|---|---|
| 1 | C1 | C2 | B1 | 3 |   |   |   | B2 | 3 |   |   |   | — |   |   |   |   |
| 2 | C1 | C3 | B1 | 1 | 1 |   |   | B3 | 1 | 1 |   |   | B4 | 1 |   |   |   |
| 3 | C1 | C4 | B1 |   | 3 |   |   | B3 |   | 3 |   |   | B5 |   | 3 |   |   |
| 4 | C2 | C3 | B2 |   |   | 2 |   | B3 |   |   | 2 |   | B4 |   |   | 2 |   |
| 5 | C2 | C4 | B2 |   |   | 2 |   | B3 |   |   | 2 |   | B5 |   |   | 2 |   |
| 6 | C3 | C4 | B3 |   |   |   | 1 | B4 |   |   |   | 1 | — |   |   |   |   |

FIG. 7

| No. | Bundle Section | ITEM1 | ITEM2 | Bundle Size [in.] | ELECTRICAL WIRE | | | | |
|---|---|---|---|---|---|---|---|---|---|
| | | | | | TOTAL NUMBER | #W1 | #W2 | #W3 | #W4 |
| 1 | B1 | C1 | A1 | XXX | 8 | 4 | 4 | 0 | 0 |
| 2 | B2 | C2 | A1 | XXY | 7 | 3 | 0 | 4 | 0 |
| 3 | B3 | A1 | A2 | XYY | 10 | 1 | 4 | 4 | 1 |
| 4 | B4 | A2 | C5 | YYY | 5 | 1 | 1 | 2 | 1 |
| 5 | B5 | A2 | C4 | YYX | 5 | 0 | 3 | 2 | 0 |

DEVICE FOR CALCULATING BUNDLE DIAMETER OF ELECTRICAL WIRE BUNDLE

BACKGROUND OF THE INVENTION

Field of the Invention

The present invention relates to a device for calculating bundle diameter of electrical wire bundle in a wire harness which includes electrical wires connecting a plurality of electronic devices with one another via connectors.

Description of the Related Art

A wiring system which is configured by interconnecting, for example, an input device, a control device, and an output device through a wire harness (hereinafter simply "harness") needs to be checked, after the system has been assembled, as to whether the electrical wires composing the harness are connected in a proper route. However, when the system has large numbers of harnesses (wires) and terminal devices, such as input devices, or relay devices, it is not easy to check the validity of the connection route from a wiring diagram spreading over multiple sheets, or to confirm the safety of the wiring.

Therefore, the present applicants have hitherto proposed the following systems: a wiring connection check system whereby a connection route can be easily checked by the unit of a single wire even when the wiring system is large (Japanese Patent No. 5182973); a system whereby those harnesses at risk of including a combination of electrical wires which are not allowed to fail at the same time and those harnesses at risk of impairing the safety if they fail at the same time are easily extracted (Japanese Patent Laid-Open No. 2014-61841); and a system whereby the safety of wiring can be qualitatively analyzed even when the wiring structure is complicated (Japanese Patent Laid-Open No. 2014-194676).

The techniques proposed in the above disclosures are based on a principle that information showing the connection of any complicated wiring can be summarized into information on either of the following (a) and (b):

(a) Connector and electrical wire
(b) Connector and terminal device or relay device Designing a wiring system including a wire harness requires a determination as to whether the harness can be actually routed. When designing the installation of a wire harness, the diameter (bundle diameter) of a bundle which is a bundle of electrical wires needs to be taken into account for the electrical wires. Calculation of the bundle diameter is significant not only in determining whether the wire harness can be actually routed but also in calculating the failure rate of the wire harness.

Therefore, the present invention aims to provide a device which can easily calculate a bundle diameter in a wire harness.

SUMMARY OF THE INVENTION

To achieve the above object, the present invention provides a device for calculating the bundle diameter of an electrical wire bundle in a wire harness of which each of a plurality of electrical wires is connected via a relay element with a pair of connectors located at terminal ends of the electrical wires, the device including: a storage unit which stores electrical wire-connector connection information in which each of the plurality of electrical wires and the pair of connectors are associated with each other, and bundle connection information which shows a state of connection with the connectors and the relay elements by the unit of the electrical wire bundle of the wire harness; and a processing unit which, when the wire harness is specified, checks the electrical wire-connector connection information and the bundle connection information against each other, counts the number of the electrical wires belonging to each of the electrical wire bundles, and calculates the bundle diameter on the basis of the counted number of the electrical wires.

According to the present invention, the bundle connection information which shows a state of connection with connectors and relay elements by the unit of the electrical wire bundle of the wire harness is provided, so that it is possible to count the number of the electrical wires belonging to the electrical wire bundle by checking the bundle connection information against the electrical wire-connector connection information. Since the diameter of each electrical wire is known, the bundle diameter can be easily calculated if the number of the electrical wires can be counted. By performing this calculation for all the harnesses included in a system to be analyzed, it is possible to easily confirm the validity of the wiring design of that system.

Even when a design change is made, the bundle diameter can be easily calculated thereafter as well by reflecting the design change in the electrical wire-connector connection information and the bundle connection information.

In the present invention, if the storage unit stores, as the electrical wire-connector connection information, type information in which the plurality of electrical wires and their respective types are associated with each other, the processing unit can count the number of the electrical wires for each type information with reference to the type information.

In the present invention, if the storage unit includes diameter information in which the type information on the electrical wires and the diameters of the electrical wires are associated with each other, the processing unit can calculate the bundle diameter by checking the type information and the diameter information against each other.

According to the present invention, the bundle connection information which shows a state of connection with connectors and relay elements by the unit of the electrical wire bundle of the wire harness is provided, so that it is possible to count the number of the electrical wires belonging to the electrical wire bundle by checking the bundle connection information against the electrical wire-connector connection information. Thus, the present invention can easily calculate the bundle diameter. By performing this calculation for all the harnesses included in a system to be analyzed, it is possible to easily confirm the validity of the wiring design of that system. Even when a design change is made, the bundle diameter in the harness can be easily calculated thereafter as well by reflecting the design change in the electrical wire-connector connection information and the bundle connection information.

DETAILED DESCRIPTION OF THE PREFERRED EMBODIMENTS

A device for calculating bundle diameter of electrical wire bundle (bundle diameter calculation device) 10 according to this embodiment is a system for calculating the bundle diameter of electrical wire bundle of a wiring system which is composed of harnesses interconnecting an input device, a control device, and an output device. The bundle diameter calculation device 10 calculates the bundle diameter of electrical wire bundle of a harness by specifying the harness of which the bundle diameter of electrical wire bundle is to be calculated.

Figure 1A:
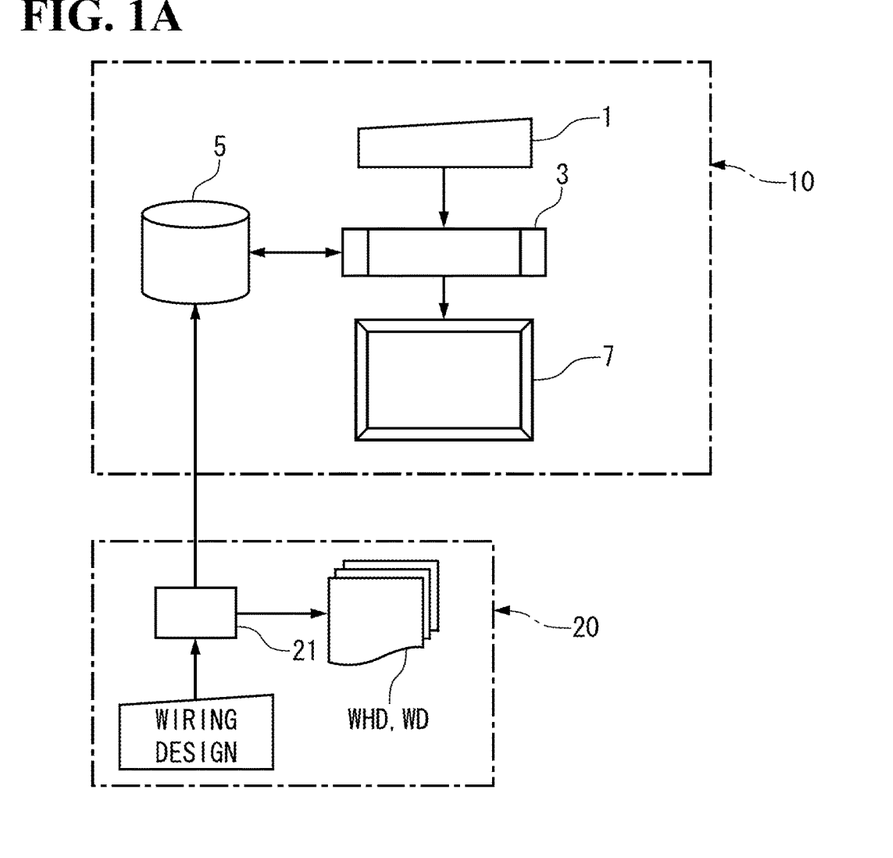
FIGS. 1A and 1B are views each showing the general configuration of a system for calculating bundle diameter of electrical wire bundle in an embodiment.

As shown in FIG. 1A, the bundle diameter calculation device according to this embodiment includes an input unit 1, a processing unit 3, a storage unit 5, and a display unit 7. The bundle diameter calculation device 10 can be configured by a personal computer or other computer devices.

The bundle diameter calculation device 10 is connected with a wiring drawing system 20. The wiring drawing system 20 is also configured by a computer device.

Here, a harness is an assembly of connectors and electrical wire bundles (bundles). Each electrical wire is electrically connected with a pin (or a terminal) of the connectors.

[Outline of Configuration of Bundle Diameter Calculation Device 10]

The input unit 1 is a part through which commands required for calculating a bundle diameter in the bundle diameter calculation device 10 are input. The input unit 1 can be configured by a keyboard as the input device of a computer.

The processing unit 3 retrieves information stored in the storage unit 5 according to a command from the input unit 1, executes a process required for calculating a bundle diameter of electrical wire bundle, and displays calculation results on the display unit 7.

Figure 1B:
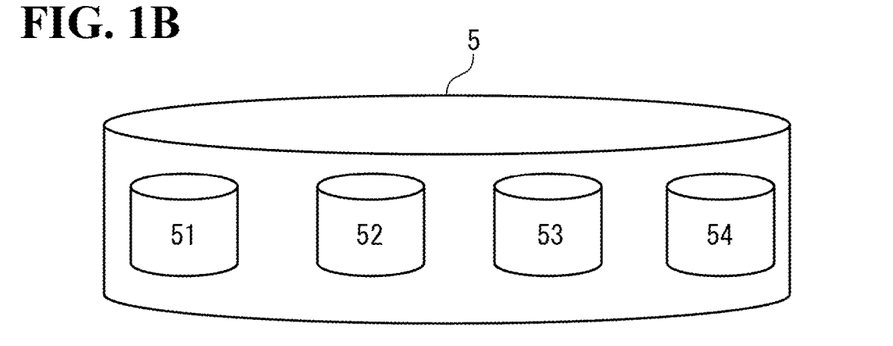

The storage unit 5 has a plurality of databases for storing various pieces of information required for calculating a bundle diameter of electrical wire bundle. As shown in FIG. 1B, these databases include a connection information database 51, a component information database 52, a bundle connection information database 53, and a calculation result database 54. The division of the storage unit 5 into these databases is to make the description easy to understand; as long as necessary information is included, the division is arbitrary, and this division is not intended to show that the storage unit 5 is physically divided. The storage unit 5 may include, in addition to these databases, a part where various pieces of information are stored. One example is a part which stores an algorithm required for the processing unit 3 to calculate a bundle diameter of electrical wire bundle.

The display unit 7 displays processing results of the processing unit 3. The display unit 7 is configured by a display as the display device of a computer.

[Outline of Wiring Drawing System 20]

The wiring drawing system 20 includes a computer aided design (CAD) 21. The CAD 21 acquires connection/position information on system components pertinent to wiring design work, and creates wire harness diagrams (WHDs) and wiring diagrams (WDs). Here, WHDs are diagrams showing the connection relation between connectors and bundles (including bundle sections and nodes), while WDs are diagrams showing the connection relation between electrical wires and connectors included in a harness.

The CAD 21 generates electrical wire-connector connection information from acquired WHDs and WDs, and provides the information to the connection information database 51 of the bundle diameter calculation device 10. The connection information database 51 stores the electrical wire-connector connection information provided from the CAD 21.

[Wiring Example]

Figure 2:
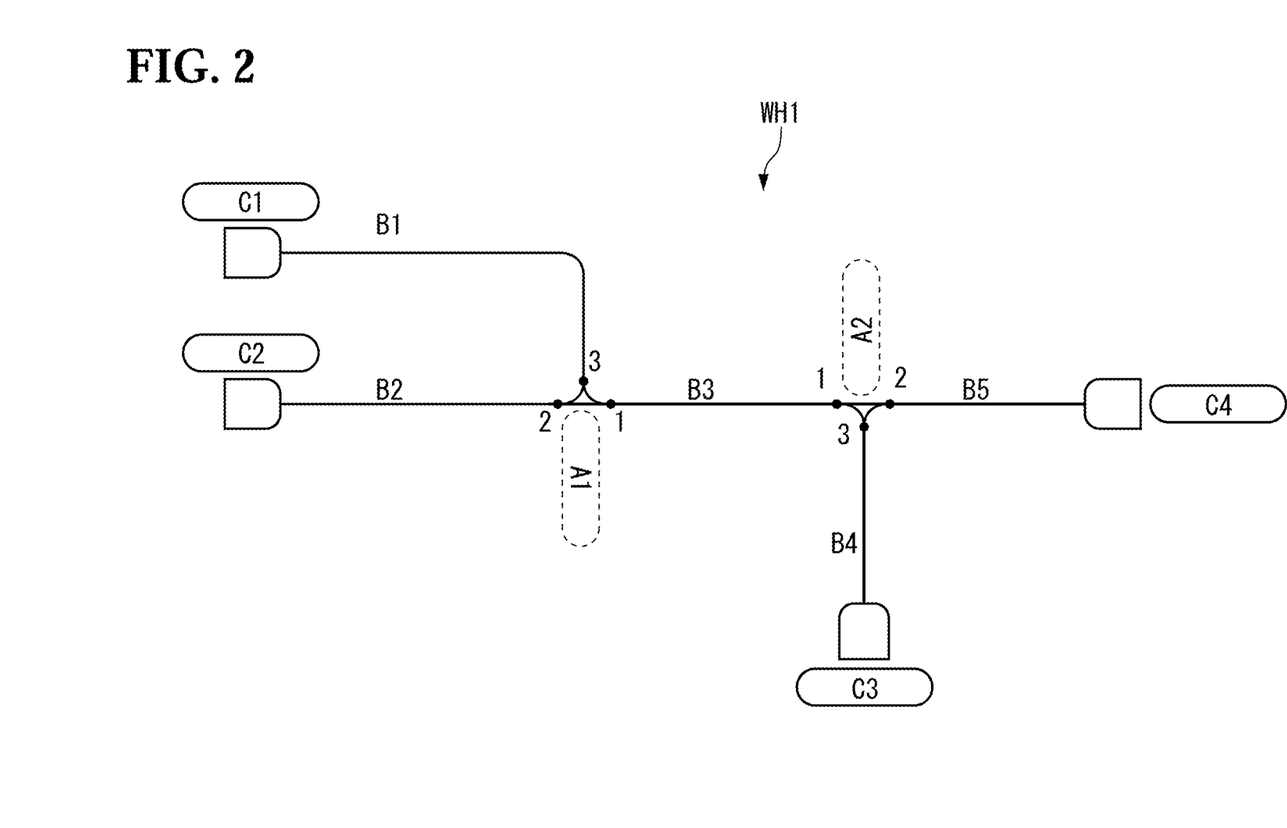
FIG. 2 is a view showing an example of wiring of which the bundle diameter of electrical wire bundle is to be calculated in the embodiment.

FIG. 2 shows one example of a harness of which the bundle diameter of electrical wire bundle is calculated in this embodiment. This wiring example corresponds with the above-mentioned wire harness diagram (WHD). Here, the numbers of the connectors and the bundles, which are components of the wiring example, are minimized for easy understanding, but this embodiment can be applied to a larger wiring system as well.

In a harness WH1 of FIG. 2, four connectors, a connector C1, a connector C2, a connector C3, and a connector C4, are interconnected via a bundle B1, a bundle B2, a bundle B3, a bundle B4, and a bundle B5, as well as via a relay point A1 and a relay point A2. While only the connectors are shown at all the terminal ends here, these connectors C1 to C4 are usually attached to devices such as an input device, a control device, and an output device, or attached to relay connectors which interconnect a plurality of harnesses. The relay points A1 to A2 are identification information on a branching position and a joining position of a plurality of bundles.

In the harness WH1, the connector C1 and the connector C2 are connected with the bundle B1 and the bundle B2, respectively. The bundle B1 is coupled to a pin 3 of the relay point A1, and the bundle B2 is coupled to a pin 2 of the relay point A1, so that the relay point A1 serves as a transit point or a contact point between the bundle B1 and the bundle B2.

Similarly, the relay point A1 and the relay point A2 are connected with each other through the bundle B3, and the bundle B3 has one end coupled to a pin 1 of the relay point A1 and the other end coupled to a pin 1 of the relay point A2.

The connector C3 is connected with the bundle B4. The bundle B4 has one end coupled to a pin 3 of the relay point A2 and the other end coupled to the connector C3.

The connector C4 is connected with the bundle B5. The bundle B5 has one end coupled to a pin 2 of the relay point A2 and the other end coupled to the connector C4.

The bundle B1 to bundle B5 each include a plurality of electrical wires, which will be described later.

Calculation of Bundle Diameter of Electrical Wire Bundle

Calculation of a bundle diameter of electrical wire bundle associated with the harness WH1 will be described below with reference to FIG. 3 to FIG. 8.

First, referring to FIG. 8, the outline of the calculation procedure for calculating bundle diameter of electrical wire bundle will be described.

The sequence of procedure is started by inputting identification information on a harness (hereinafter, "harness ID"), of which the bundle diameter of electrical wire bundle is to be calculated, from the input unit 1 (S101 of FIG. 8). The harness ID is information given to each harness for identification, and here the harness ID "WH1" is input according to the wiring example of FIG. 2. The harness ID having been input is sent to the processing unit 3.

Figure 3:
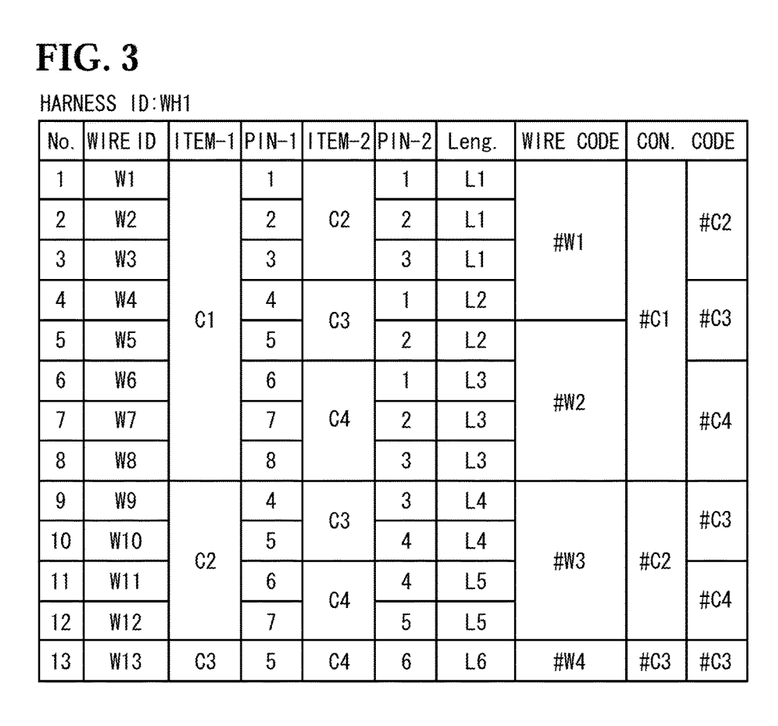
FIG. 3 is a view showing connection information in which electrical wires and connectors are associated with each other.
Figure 8:
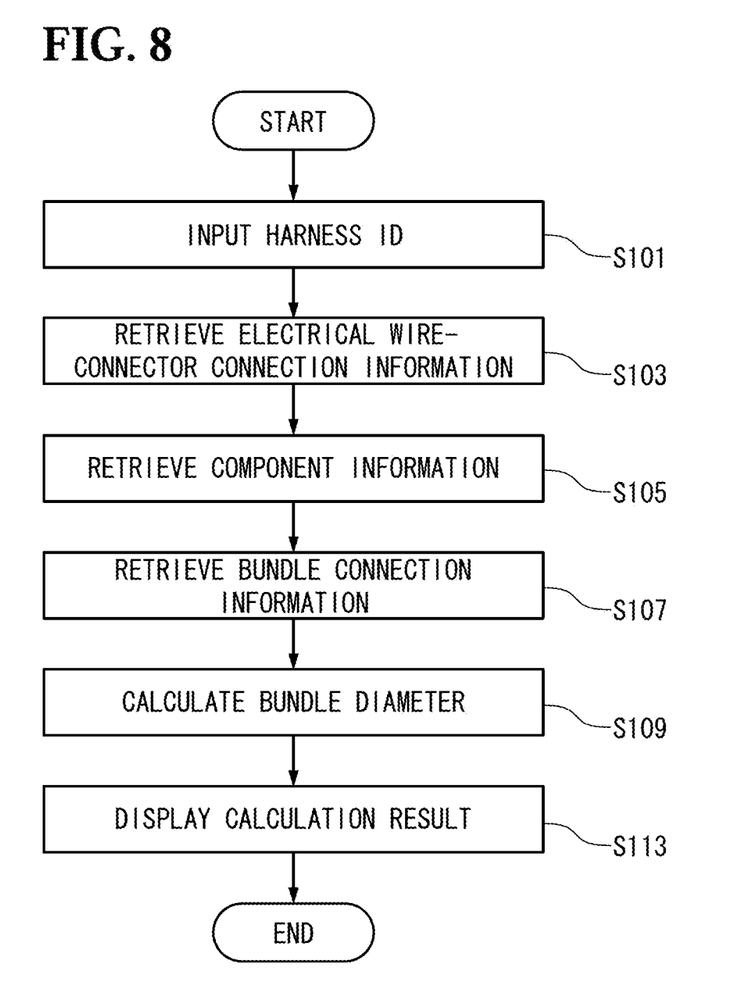
FIG. 8 is a flowchart showing a procedure for calculating bundle diameter of electrical wire bundle in the embodiment.

Having acquired the harness ID, the processing unit 3 retrieves electrical wire-connector connection information associated with this harness ID (WH1) from the connection information database 51 of the storage unit 5 (S103 of FIG. 8, FIG. 3). By checking the retrieved electrical wire-connector connection information, the processing unit 3 retrieves component information on each of the connectors C1 to C4 and electrical wires W1 to W13 belonging to the harness WH1 from the component information database 52 of the storage unit 5 (S105 of FIG. 8, FIG. 4).

Figure 5:
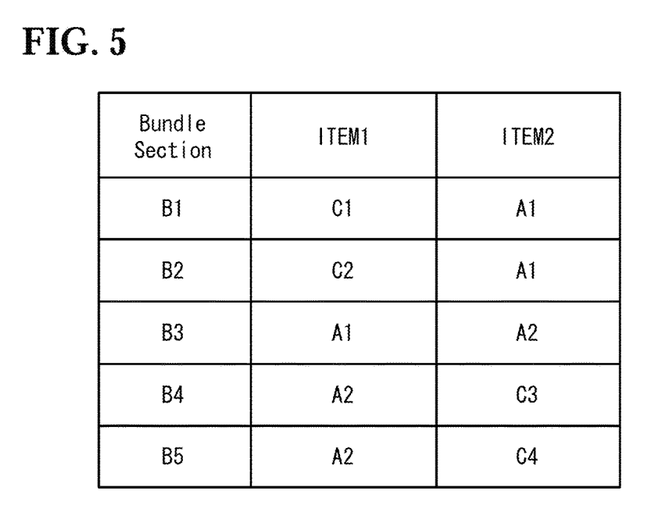
FIG. 5 is a view showing bundle connection information in which identification information on bundles and identification information on pairs of connectors are associated with each other.

Next, the processing unit 3 retrieves bundle connection information on the harness WH1 from the bundle connection information database 53 of the storage unit 5 (S107 of FIG. 8, FIG. 5).

As shown in FIG. 5, the bundle connection information is information in which each of the bundles B1 to B5 and the connectors and the relay points connected at both ends of the bundle are associated with each other. This bundle connection information also indicates the length of each bundle.

Figure 6:
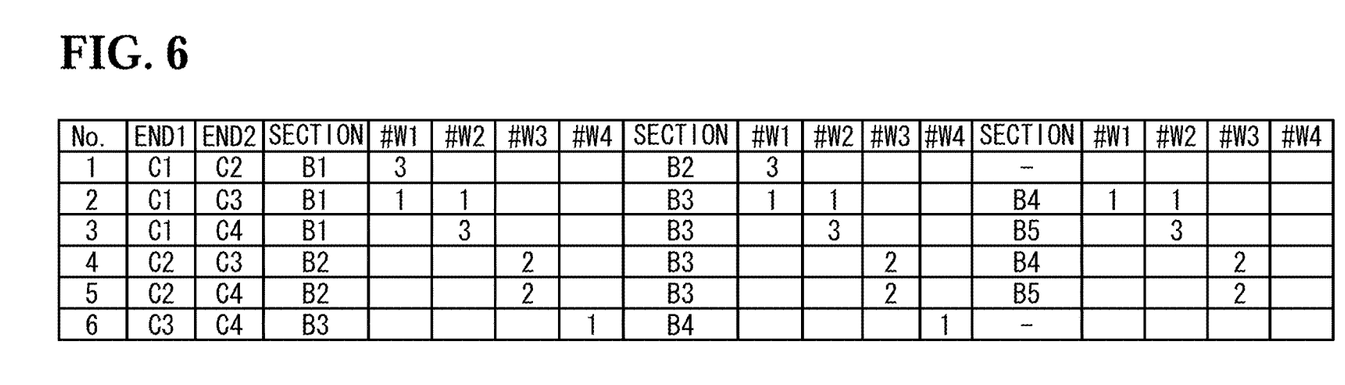
FIG. 6 is a view showing the number of electrical wires, for each type, belonging to the bundles.

Having retrieved the above information, the processing unit checks the bundle connection information (FIG. 5) and the electrical wire-connector connection information (FIG. 3) against each other, and counts the number of the electrical wires for each type included in each bundle (FIG. 6). Then, having found out the number of the electrical wires for each type belonging to each of the bundles B1 to B5, the processing unit 3 calculates the diameter (bundle size), so-called bundle diameter, of each of the bundles B1 to B5 with reference to wire diameters d1 to d4 of electrical wires #W1 to #W4 in the component data shown in FIG. 4 (S109 of FIG. 8, FIG. 7).

To calculate the bundle diameter D, the bundles can be divided, for example, as shown below, into a case where the bundle includes different types of electrical wires with different wire diameters and a case where the bundle includes the same type of electrical wires of the same wire diameter (where the number of the electrical wires is six or less).

Different types: $D=1.154 \times (d^2_A N_A + d^2_B N_B + d^2_C N_C \ldots)^{1/2}$ where
D: Bundle diameter of bundle
$d_A, d_B, d_C \ldots$ : Wire diameter (diameter) of each electrical wire A, B, C . . .
$N_A, N_B, N_C \ldots$ : Number of each electrical wire A, B, C . . .

Same type: $D=1.154 \times (d^2_A N_A + d^2_B N_B + d^2_C N_C \ldots)^{1/2}$

D=2d (where the number is two)
D=2.155d (where the number is three)
D=2.414d (where the number is four)
D=3d (where the number is five or six)
where
d: Wire diameter (diameter) of electrical wire The specific contents of step S103 and the subsequent steps of FIG. 8 will be sequentially described herein below.

[Retrieval of Electrical Wire-Connector Connection Information (S103 of FIG. 8, FIG. 3)]

The electrical wire-connector connection information, which is retrieved by the processing unit 3 from the connection information database 51 when calculating a bundle diameter of electrical wire bundle, is information in which the electrical wires belonging to each harness, the connectors directly connected at both ends of each electrical wire, and the connectors with which each electrical wire is finally connected via other electrical wire and connector, are associated with one another.

FIG. 3 shows the electrical wire-connector connection information on the harness WH1.

In the example of FIG. 3, there are 13 electrical wires belonging to the harness WH1. The connector IDs "C1" and "C2" are respectively given to the pair of connectors which are connected at both ends of the electrical wire given the wire ID "W1" among the electrical wires.

The electrical wire-connector connection information includes information (rows PIN-1, 2) about which pin (terminal) of the connectors C1 to C4 each of the electrical wires W1 to W13 is connected with.

The electrical wire-connector connection information also includes length of each of the electrical wires W1 to W13 (row Leng), and type of the electrical wires (WIRE CODE) as well as type of the connectors (CON. CODE).

The electrical wire-connector connection information shown in FIG. 3 shows that the electrical wire W1 connects the connector C1 and the connector C2 with each other; the length of the electrical wire W1 is L1; the type of the electrical wire W1 is #W1; and the types of the connectors C1 and C2 are #C1 and #C2, respectively. It is also shown that the electrical wire W9 connects the connector C2 and the connector C3 with each other; the length of the electrical wire W9 is L4; the type of the electrical wire W9 is #W3 and the types of the connectors C2 and C3 are #C2 and #C3, respectively.

[Retrieval of Component Information (S105 of FIG. 8, FIG. 4)]

Figure 4:
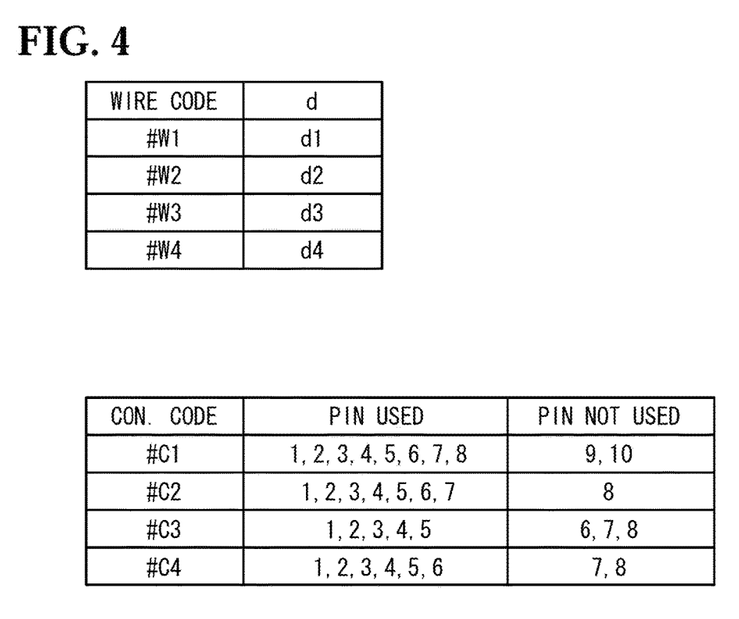
FIG. 4 is a view showing component information in which type information on the electrical wires and the connectors and their component specifications are associated with each other.

As shown in FIG. 4, the component information retrieved from the storage unit 5 includes information in which the types and the wire diameters d of the electrical wires are associated with each other, and information in which the types and the pin numbers used of the connectors are associated with each other.

FIG. 4 shows that, for example, the wire diameter d of the electrical wire of the type #W1 is d1, and that the pins used of the connector of the type #C1 are a pin 1 to a pin 8.

[Calculation of Bundle Diameters of Bundles B1 to B4 (S109 of FIG. 8, FIG. 5 to FIG. 7)]

As described above, when designing the installation of a wire harness, the diameter (bundle diameter) of a bundle which is a bundle of electrical wires needs to be taken into account for the electrical wires, and calculation of the bundle diameter is significant in determining whether the harness can be actually routed. Therefore, the bundle diameters of the bundles B1 to B5 are calculated after the types and the numbers of the electrical wires forming each bundle are obtained by checking the electrical wire-connector connection information (FIG. 3) and the bundle connection information (FIG. 5) against each other.

As shown in FIG. 5, the bundle connection information is information in which each of the bundles B1 to B5 and the connectors and the relay points connected at both ends of the bundle are associated with each other. For example, FIG. 5 shows that the bundle B1 is arranged between the connector C1 and the relay point A1.

The number of the electrical wires is counted as follows. First, connectors making pairs (END1, END2) are listed as shown in FIG. 6. Here, to take No. 1 as an example which shows the relation between the connector C1 and the connector C2, the electrical wires which connect the connector C1 and the connector C2 with each other are the electrical wires W1, W2, W3 as shown in FIG. 3, and the bundle B1 and the bundle B2 are interposed between the connector C1 and the connector C2 via the relay point A1 as shown in FIG. 5. Thus, since all the electrical wires W1, W2, W3 belong to the bundle B1 and the bundle B2, three electrical wires belong to the bundle B1 and three electrical wires belong to the bundle B2. Since the wire codes of the electrical wires W1, W2, W3 are all #W1 as shown in FIG. 3, the number of the electrical wires identified by #W1 in the bundle B1 is three, and the number of the electrical wires identified by #W1 in the bundle B2 is three.

Similarly, to take No. 2 as an example which shows the relation between the connector C1 and the connector C3, the electrical wires which connect the connector C1 and the connector C3 with each other are the electrical wires W4, W5, and the bundle B1, the bundle B3, and the bundle B4 are interposed between the connector C1 and the connector C3 via the relay points A1, A2. Thus, since both the electrical wires W4, W5 belong to the bundle B1, the bundle B3, and the bundle B4, two electrical wires belong to each of the bundle B1, the bundle B3, and the bundle B4. Since the wire code of the electrical wire W4 is #W1 and the wire code of the electrical wire W5 is #W2 as shown in FIG. 3, in each of the bundle B3 and the bundle B4, the number of the electrical wires identified by #W1 is one and the number of the electrical wires identified by #W2 is one. FIG. 6 shows the number of the electrical wires in each bundle interposed between the pair of connectors thus obtained.

Figure 7:
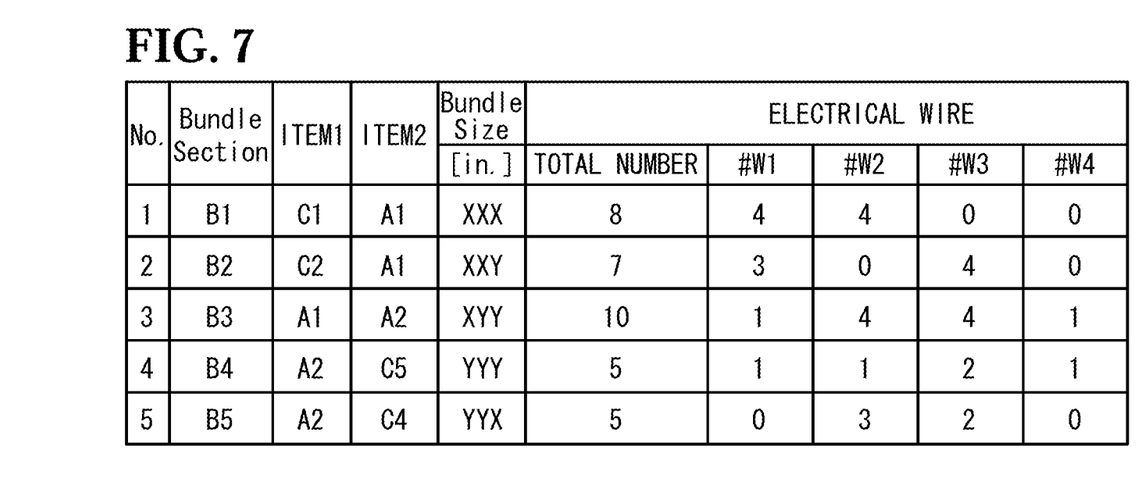
FIG. 7 is a view showing calculation results of the bundle diameters of the bundles in the wiring example of FIG. 2.

Having found out the number of the electrical wires, for each type, belonging to each of the bundles B1 to B5, the processing unit 3 adds up the numbers of the electrical wires for each type, and with reference to the wire diameters d1 to d4 of the electrical wires #W1 to #W4 in the component data shown in FIG. 4, calculates the diameter (bundle size) of each of the bundles B1 to B5. FIG. 7 shows the results, with the bundles B1 to B5 and their respective diameters (bundle sizes) associated with each other.

The final calculation results are displayed on the display unit 7, and with reference to these calculation results, a wire harness designer can determine whether or not the design at the current point is proper. If the calculated bundle diameter does not meet the required standard, the designer reviews the design and reflects the result in the electrical wire-connector connection information. That is, the designer makes a design change, such as changing the types of electrical wires to be used, and rewrites the electrical wire-connector connection information. Thereafter, the designer calculates the bundle diameter in the same manner to evaluate the properness of the design.

[Effects of Embodiment]

As has been described above, according to this embodiment, the electrical wire-connector connection information includes the type information, and the electrical wire-connector connection information is linked to the component information written in the component database on the basis of the type information, so that the bundle diameter of all the bundle parts in the harness can be easily calculated. By performing this calculation for all the harnesses included in a system to be analyzed, the validity of the wiring design of the system can be confirmed.

Even when a design change is made, the bundle diameter in the harness can be calculated thereafter as well by reflecting the design change in the electrical wire-connector connection information.

Moreover, according to this embodiment, the connection information database 51 includes, as the electrical wire-connector connection information, the type information on each of the electrical wires and the connectors, and the component information database 52 includes the component information on each of the electrical wires and the connectors, the bundle diameter can be easily calculated.

Since the bundle connection information shown in FIG. 5 is provided, the number of the electrical wires belonging to each bundle can be counted and, as a result, the bundle diameter can be calculated.

Moreover, the electrical wire-connector connection information includes the type information on the electrical wires and the component information database 52 includes the information about the wire diameters d of the electrical wires, so that the number of the electrical wires for each type can be counted, as well as the bundle diameter of the bundle to which the plurality of types of electrical wires belong can be calculated.

While the present invention has been described above on the basis of the embodiment, it is possible to selectively adopt the configurations presented in the above embodiment, or appropriately modify these configurations into other configurations, within the scope of the present invention.

In the above example, final calculation results are the object to be displayed, but information generated as the processing unit 3 performs the procedure can also be displayed sequentially on the display unit 7.

The wiring example used for the description of the embodiment is merely an example, and it goes without saying that the present invention is applicable to other wiring examples as well.

There is no limitation on devices, apparatuses, etc. to which the present invention is applied, and the present invention is applicable to various devices and apparatuses in which terminal devices and relay devices are connected with one another through cables.

Furthermore, the bundle diameter calculation device 10 is preferably used for designing and/or building a large wiring system, which is for example mounted on an aircraft, while the device 10 is also preferably used for producing a large wiring system and/or a large number of wire harnesses partly constituting the wiring system, which are for example mounted on an aircraft.

What is claimed is:

1. A device for calculating the bundle diameter of an electrical wire bundle in a wire harness of which each of a plurality of electrical wires is connected via a relay element with a pair of connectors located at terminal ends of the electrical wires, the device comprising:

a storage unit including a connection information database which stores electrical wire-connector connection information in which each of the plurality of electrical wires and the pair of connectors are associated with each other, and a bundle connection information database which stores bundle connection information which shows a state of connection with the connectors and the relay elements by the unit of the electrical wire bundle of the wire harness;

a processing unit which, when the wire harness is specified, checks the electrical wire-connector connection information and the bundle connection information against each other, counts the number of the electrical wires belonging to each of the electrical wire bundles, and calculates the bundle diameter on the basis of the counted number of the electrical wires; and a display unit configured to display final calculation results, wherein:

the electrical wire-connector connection information includes connector type information in which the pair of connectors and their respective types are associated with each other, the storage unit further includes connector component information in which the connector type information and connector component information on the pair of connectors are associated with each other, and the connector component information includes information about a pin used for the connector and a pin not used for the connector.

2. The device for calculating the bundle diameter of an electrical wire bundle according to claim 1, wherein the storage unit stores, as the electrical wire-connector connection information, type information in which the plurality of electrical wires and their respective types are associated with each other, and the processing unit counts the number of the electrical wires for each type information with reference to the type information.

3. The device for calculating the bundle diameter of an electrical wire bundle according to claim 2, wherein the storage unit includes diameter information in which the type information on the electrical wires and the diameters of the electrical wires are associated with each other, and the processing unit calculates the bundle diameter by checking the type information and the diameter information against each other.

4. The device for calculating the bundle diameter of an electrical wire bundle according to claim 3, wherein, the processing unit is configured to calculate the bundle diameter by diving into a case where the electrical wire bundle includes different types of the electrical wires with the diameters different from each other, and a case where the electrical wire bundle includes same types of the electrical wires with the same diameters.

5. The device for calculating the bundle diameter of an electrical wire bundle according to claim 1, wherein the storage unit includes diameter information in which the type information on the electrical wires and the diameters of the electrical wires are associated with each other, and the processing unit calculates the bundle diameter by checking the type information and the diameter information against each other.

6. The device for calculating the bundle diameter of an electrical wire bundle according to claim 5, wherein, the processing unit is configured to calculate the bundle diameter by diving into a case where the electrical wire bundle includes different types of the electrical wires with the diameters different from each other, and a case where the electrical wire bundle includes same types of the electrical wires with the same diameters.

7. A method for producing a wiring system, the wiring system including a wire harness of which each of a plurality of electrical wires is connected via a relay element with a pair of connectors located at terminal ends of the electrical wires, wherein the wiring system is produced based on a design for a wiring system created by using the device according to claim 1.

8. The method for producing a wiring system according to claim 7, wherein the wire harnesses interconnect an input device, a control device, and an output device configured to display final calculation results allowing a wire harness designer to determine whether the design is proper.

9. The method for producing a wiring system according to claim 7, wherein the wiring system is mounted on an aircraft.

10. A method for producing a wire harness of which each of a plurality of electrical wires is connected via a relay element with a pair of connectors located at terminal ends of the electrical wires, wherein the wire harness is produced based on a design for a wiring system created by using the device according to claim 1.

11. The method for producing a wire harness according to claim 10, wherein the wire harness is mounted on an aircraft.

12. A method for calculating the bundle diameter of an electrical wire bundle in a wire harness of which each of a plurality of electrical wires is connected via a relay element with a pair of connectors located at terminal ends of the electrical wires, the method comprising steps of using the device according to claim 1 to perform:

retrieving electrical wire-connector connection information in which each of the plurality of electrical wires and the pair of connectors are associated with each other;

retrieving bundle connection information which shows a state of connection with the connectors and the relay elements by the unit of the electrical wire bundle of the wire harness; and checking, when the wire harness is specified, the electrical wire-connector connection information and the bundle connection information against each other to count the number of the electrical wires belonging to each of the electrical wire bundles so as to calculate the bundle diameter on the basis of the counted number of the electrical wires.

13. The method according to claim 12, wherein the method further comprises a step of retrieving type information, as the electrical wire-connector connection information, in which the plurality of electrical wires and their respective types are associated with each other, to count the number of the electrical wires for each type information with reference to the type information.

14. The device for calculating the bundle diameter of an electrical wire bundle according to claim 1, further comprising an input unit configured to input identification information on the wire harness of which the bundle diameter of the electrical wire bundle is calculated.

15. The device for calculating the bundle diameter of an electrical wire bundle according to claim 14, wherein the processing unit retrieves, from the storage unit, the electrical wire-connector connection information associated with the inputted identification information, and calculates the bundle diameter based on the inputted identification information.

16. The device for calculating the bundle diameter of an electrical wire bundle according to claim 1, wherein the electrical wire-connector connection information is generated from wire harness diagrams showing a connection relation between the connectors and the electrical wire bundles, and wiring diagrams showing a connection relation between the electrical wires and the connectors included in the wire harness.

17. The device for calculating the bundle diameter of an electrical wire bundle according to claim 1, wherein the final calculation results displayed by the display unit allow a wire harness designer to determine whether a design for a wiring system including the wire harness is proper.

\* \* \* \* \*

UNITED STATES PATENT AND TRADEMARK OFFICE
CERTIFICATE OF CORRECTION

PATENT NO. : 10,354,021 B2
APPLICATION NO. : 15/046709
DATED : July 16, 2019
INVENTOR(S) : Koji Toyama et al.

It is certified that error appears in the above-identified patent and that said Letters Patent is hereby corrected as shown below:

In the Specification

Column 5, Line 32, "unit checks" should read -- unit 3 checks --.

Signed and Sealed this
Twenty-second Day of October, 2019

Andrei Iancu
*Director of the United States Patent and Trademark Office*